Patented Oct. 24, 1950

2,527,306

UNITED STATES PATENT OFFICE 2,527,306

PREPARATION OF BETA-OXO ESTERS

Isaac F. Halverstadt, Berkeley, Calif., assignor to American Cyanamid Company, New York, N. Y., a corporation of Maine No Drawing. Application May 1, 1947, Serial No. 745,243

4 Claims. (Cl. 260—483)

The present invention relates to the preparation of beta-oxo carboxylic acid esters. More particularly it relates to a method of preparing beta-oxo monocarboxylic acid esters and aralkyl beta-oxo monocarboxylic acid esters.

The compounds prepared by the process of the present invention can be illustrated by the following general formula

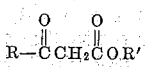

in which R is an alkyl or an aralkyl radical and R' is an alkyl radical.

The compounds are prepared by heating an alpha, gamma dioxo monocarboxylic acid ester to a relatively high temperature in the presence of a substance having a large surface area per unit volume.

The preferred substance is ground glass. However, other substances can be used such as sodium formate, sodium chloride, activated carbon, coke, pumice, and the like or mixtures thereof.

The reaction can be carried out using a number of intermediates. Among these may be mentioned methyl acetopyruvate; methyl propionopyruvate; methyl butyropyruvate; methyl delta-dimethyl-alpha,gamma-dioxocaproate; ethyl valeropyruvate; ethyl caprylopyruvate; methyl myristylpyruvate; ethyl stearoylpyruvate and the like.

The product obtained after driving off the carbon monoxide is purified by fractional distillation. The beta-oxo-monocarboxylic acid esters when fractionally distilled give a relatively pure product which is useful as an intermediate. In some cases it may be desirable to carry out the reaction under partial vacuum and distil the product as formed.

The reaction is preferably carried at a temperature of from about 175° to about 250° C. However, the reaction can be carried out at a temperature of from about 150° to about 275° C. depending somewhat on the intermediate used.

The reaction when conducted as a batch process is completed generally in from about 10 minutes to about 4 hours. However, the time may be somewhat longer, up to 6 hours or more, depending upon the reactant and temperature used in the reaction. The reaction can, also, be conducted practically instantaneously by heating to a relatively high temperature the substance having a large surface area in a tube into which the intermediate is fed at one end and the product recovered at the other end.

The compounds of the present invention are useful as intermediates in the preparation of substituted thiouracils such as those described in co-pending application Serial No. 602,420, filed June 29, 1945, now abandoned. They are, also, valuable as intermediates in the preparation of substituted 4-oxo-6-alkyl pyrimidines and similar compounds.

The following examples illustrate in greater particularity the method of preparing the various beta-oxo monocarboxylic acid esters. It will be understood that these examples are given for purposes of illustrating preferred processes and are not to be construed as limiting the invention to the processes described therein.

Example I

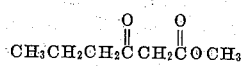

A mixture of 17.2 g. of methyl butyropyruvate and 2 g. of ground soft glass was heated at a temperature of about 240° C. (bath temperature 365° C.) for approximately 3 hours. The mixture obtained was then redistilled and the fraction boiling at 85° to 90° C./14 mm. was collected. The product obtained was methyl beta-oxo-caproate. The identity of the product was proved by reaction with thiourea which gave the product 6-propyl-2-thiouracil.

Example II

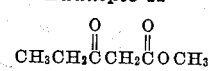

A mixture of 15.8 g. of methyl propionopyruvate and 2 g. of ground soft glass was distilled as rapidly as possible at a temperature of about 210° C. The mixture obtained was redistilled and the fraction, with boiling point 60°–65°/14 mm. was collected. The product obtained was methyl beta oxo-valerate. The copper salt of this compound was prepared and had a melting point of 155° to 157° C. This is very close to the melting point of the copper salt of methyl beta-oxo-valerate as reported in the literature.

Example III

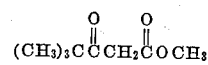

A mixture of 950 g. (5.1 mol) of methyl delta-dimethyl-alpha, gamma dioxocaproate and 100 g. of powdered soft glass (50%–100 mesh and 50%–200 mesh) was subject to pyrolysis at about 175° C. After 1 hour 37% of the carbon monoxide was evolved, after 2 hours 80% and after 5½ hours the theoretical amount was evolved. After completion of pyrolysis the mixture was distilled and the fraction boiling at 90° to 94° C. (20 mm.) was collected. A yield of 643 g. (4.08 mol) 80% of methyl gamma-dimethyl-beta-oxovalerate was obtained.

To a mixture of 5 liters of methanol and 10 mols of sodium metal was added 765 g. of the compound obtained above and 513 g. of thiourea. The total mixture was heated to reflux with steam. A precipitate formed after 45 minutes and heating was continued for 5 hours. The product obtained after several recrystallizations and further purification was 350 g. of 6-tertiary butyl-2-thiouracil having a melting point of 178° to 179° C.

*Example IV*

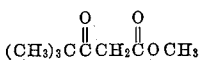

A mixture of 18.62 g. of methyl delta-dimethyl-alpha,gamma-dioxocaproate and 2 g. of ground soft glass was heated at 175° C. for approximately 5 hours. During this time approximately 95% of the theoretical volume of carbon monoxide was driven off. The residual liquid was then redistilled and the fraction boiling at 91°-96° C./20 mm. was collected. On analysis, the product proved to be methyl gamma-dimethyl-beta-oxovalerate.

*Example V*

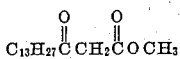

To 3.2 g. of methyl myristyl-pyruvate was added 2 g. of ground soft glass and the mixture heated gradually to 204° C., but kept mostly at 185° C. for about 4 hours. The residual liquid was distilled and the distillate on cooling solidified. The solid was then recrystallized from dilute ethanol and the product, methyl beta-oxo-tridecylpropionate, had a melting point of 34° to 35° C.

I claim:

1. A method of preparing compounds having the general formula

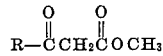

in which R is a lower alkyl radical which comprises heating a compound having the formula:

in which R is as defined above, in the presence of ground glass at a temperature of about 150° C. to about 275° C. for from about 10 minutes to about 4 hours.

2. A method of preparing methyl beta-oxocaproate which comprises heating methyl butyropyruvate in the presence of ground glass at a temperature of about 175° C. to about 250° C. for from about 10 minutes to about 4 hours.

3. A method of preparing methyl beta-oxovalerate which comprises heating methyl propionopyruvate in the presence of ground glass at a temperature of about 175° C. to about 250° C. for from about 10 minutes to about 4 hours.

4. A method of preparing methyl gamma-dimethyl-beta-oxovalerate which comprises heating methyl delta-dimethyl-alpha,gamma-dioxocaproate in the presence of ground glass at a temperature of about 175° C. to about 250° C. for from about 10 minutes to about 4 hours.

ISAAC F. HALVERSTADT.

REFERENCES CITED

The following references are of record in the file of this patent:

UNITED STATES PATENTS

| Number | Name | Date |
|---|---|---|
| 1,524,962 | Altwegg et al. | Feb. 3, 1925 |

OTHER REFERENCES

Hurd, Pyrolysis of Carbon Compounds (1929), pages 556-558, published by Chemical Catalog Co., New York, N. Y.